UNITED STATES PATENT OFFICE 2,525,644

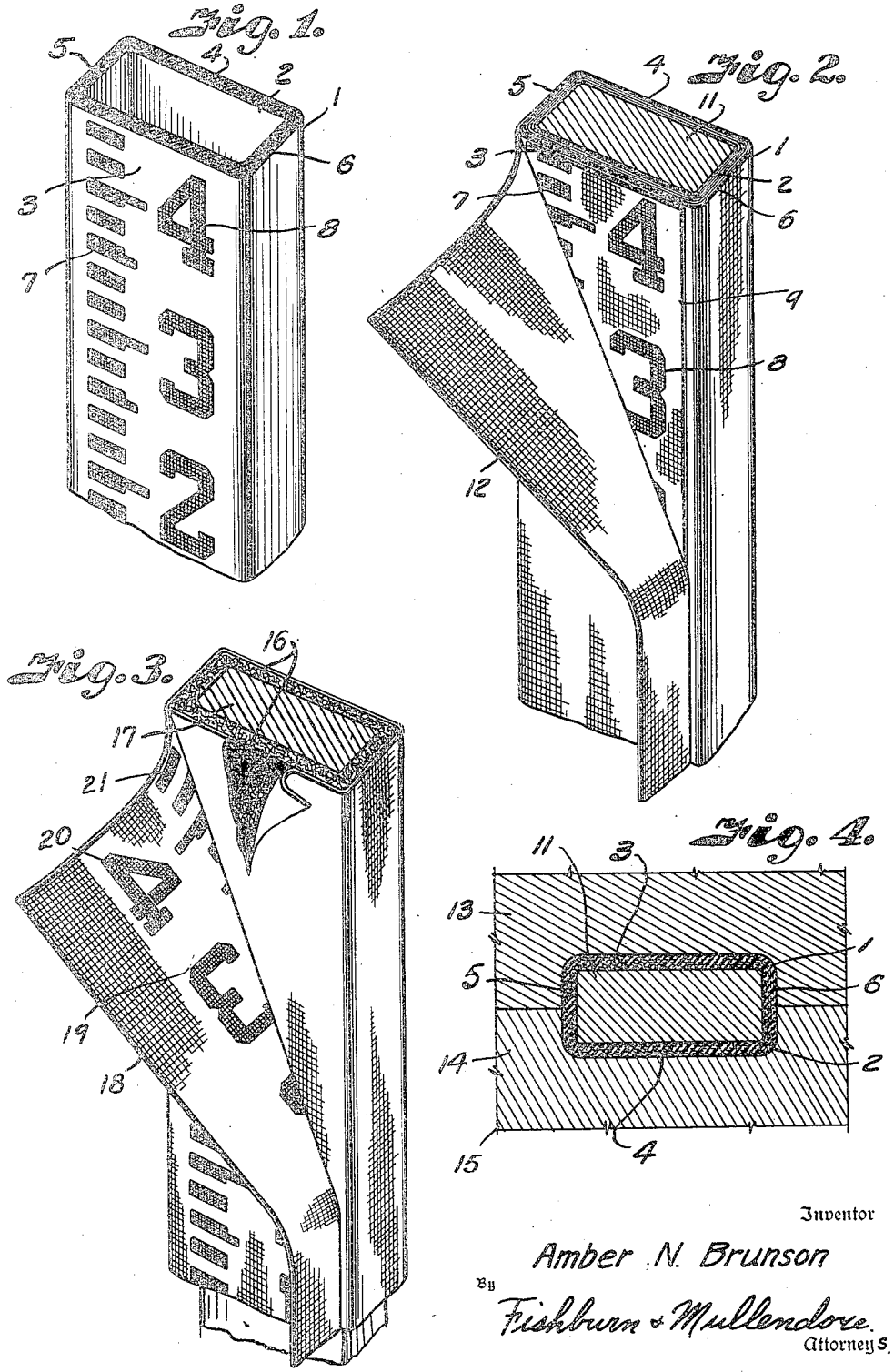

MEASURING DEVICE AND METHOD OF MAKING THE SAME

Amber N. Brunson, Independence, Mo.

Application January 13, 1947, Serial No. 721,811

3 Claims. (Cl. 154—91)

This invention relates to measuring and like devices that are equipped with graduations or other markings such as the various rods used in surveying and has for its principal object to provide a surveyor's rod of rigid, light-weight and lasting construction and which remains straight and true to length and is not affected by the elements.

It is also an object of the invention to provide a composite structure and method of making the same wherein the graduations or markings are applied and covered by an outer layer of translucent material so that they cannot be worn off through use of the device.

Further objects of the invention are to provide a composite construction of plastic materials which permits simple and accurate application of the graduations, markings or other indicia; to provide a construction employing interengaged plastic fibers which may be used in mat and the mat wrapped with a plastic fabric or the fibers may be in fabric layers built up to form an integral body of substantially homogeneous section; to provide a construction wherein the graduations or markings are readily applied by printing or stenciling processes with a coloring material that becomes incorporated into the layer of material to which it is applied; and to provide a laminated rod of hollow cross section or of any cross section suited for a particular type of use.

In accomplishing these and other objects of the invention hereinafter pointed out, I have provided improved structure and method of manufacture, the preferred forms of which are illustrated in the accompanying drawings wherein:

Fig. 1 is a fragmentary section of a leveling rod constructed of fabric laminations in accordance with the present invention.

Fig. 2 is a similar view showing the rod under construction.

Fig. 3 is a view similar to Fig. 2 of a modified form of the invention.

Fig. 4 is a section through the mold used in consolidating the materials of which the rod is formed.

Referring more in detail to the drawings and first to Figs. 1 and 2:

1 designates a portion of a measuring device constructed in accordance with the present invention, for example, a leveling rod and which includes a hollow body 2 having front and rear walls 3—4 and side walls 5—6, the front wall being provided with a series of graduations 7 and designating numerals 8. In this form of the invention, the walls of the rod are formed of a plurality of layers of plastic material which is resistant to the elements and which may be treated to form a homogeneous body either autogenously or with a plastic resin material when subjected to heat and/or pressure and which is adapted to be printed upon to provide the necessary markings 7 and 8.

The material which I have found highly suitable for the purpose is a fabric woven from threads composed of glass fibers and known as glass cloth. This material is readily cut to shape for forming a plurality of layers or the layers may be effected by wrapping the fabric upon a core or mandrel to build up the required thickness of the walls. Such material is readily imprinted with an ink, paint or other coloring matter which becomes thoroughly bedded into the spaces between the threads. The coloring matter selected is preferably one that is not miscible with the plastic fibers or any plastic material used in bonding the fibers together. It is also essential that the coloring matter be unaffected by the heat and pressure necessary in incorporating the fibers into a unitary body.

The coloring matter may be applied by stenciling or by printing with type on a strip 9 which is preferably the same material as the fabric although the strip may be of any material that is non-stretchable and which retains its dimensions after printing. The strip 9 is applied under one of the outer layers so that the coloring matter is clearly visible through an outer layer or final wrap of the fabric. If desired, the coloring matter may be printed or stencilled directly on the surface of one of the outer plies of fabric. In case the coloring matter is printed on the underface of the fabric the imprinting is made with a positive type so that it appears in proper order when viewed from the face side of the material. The markings may also be accomplished by the aid of a stencil and brush as will be readily apparent.

While any ink or coloring matter that is not miscible with the materials is satisfactory, I prefer a coloring material of the type used in decorating china as this material is readily taken up by the fabric and penetrates through the meshes thereof so as to form a substantially solid print visible through an overlying layer of fabric as shown in Fig. 1.

In cases where the coloring material is applied to the rear face of a top layer, it passes through the meshes of the fabric and appears on the outer surface. Since the coloring material thoroughly penetrates the layer, it is not worn through by sliding contact of cursors or targets used on the rod.

The cementing or bonding material is preferably a liquid synthetic resin such as a phenolic or styrene product or a polyester resin which permits low as well as high pressures in bonding the fibers and layers together.

In making a rod as shown in Fig. 1, the fabric, glass cloth, is wound upon a tapered core 11 having the cross sectional shape of the rod. The fabric is wrapped with one layer upon the other until a sufficient number of layers have been built up to give a wall of the desired thickness. Prior to the final wrap of the fabric, a strip 9 of the glass cloth is printed with the graduations and numerals 7 and 8 and inserted on the face side, after which the winding is continued over and across the strip 9. The free edge 12 is then sealed to the body of the winding fabric. The fabric may be impregnated or coated simultaneously with the winding by the cementing or bonding medium. The core with its wrapping is placed within the sections 13 and 14 of a mold 15 and sufficient pressure and heat is applied to cure and consolidate the material in the form of a substantially unitary body with layers of fabric securely sealed and bonded together by the resinous material which under the heat and pressure exudes through the meshes of the fabric. After the heat and pressure treatment, the core with the hollow body thereon is removed from the mold, after which the core is removed from the hollow body completing the operation.

The form of invention shown in Fig. 3 is produced by wrapping a fiber glass mat 16 about the core 17 after which a strip of glass cloth 18 is wrapped over the mat. In the illustrated instance the figures and graduations are shown applied to the inner face 19 of the fabric as indicated at 20 and 21. The mat and cloth are then saturated with the resinous bonding material and the prepared unit is placed in a mold or press and subjected to heat and pressure to solidify the bonding material. The unit is then removed from the mold and the core is removed from the completed rod.

It is obvious that the rod may be constructed in other shapes depending upon the cross section of the core and shape of the mold. For example, a channel shape may be accomplished by cutting strips of the fabric and placing them one upon another about one face and sides of the core, after which the strip 9 may be applied to another layer of fabric placed thereover. The unit is then placed in a mold and subjected to heat and pressure as previously described.

If a resin-coated fabric is used then the impregnating step may be eliminated. The heat and pressure will be sufficient to fuse the coating and provide the desired unitary structure.

The rods when formed may be trimmed at the ends and provided with the usual fittings, as in the case of jointed or sectional rods.

When the rod is completed, it is obvious that the body thereof will be composed of closely interengaged fibers or strands, for example, of glass, which are secured together by the solidified resinous material to give the required strength and rigidity necessary in the construction of measuring rods.

From the foregoing it is obvious that I have provided a measuring device having scale graduations such as a surveyor's rod wherein the graduations, numerals or other markings are protected by the outer layer of material so that they are not subject to wearing off through use or when targets and cursors are slid along the rod.

It is also obvious that I have provided a rod that is very strong, is of light-weight construction and is not subject to expansion and contraction or deterioration by the elements to which the device may be exposed.

While I have illustrated and described a surveyor's rod and the method of making such rods, it is obvious that the invention is applicable to any type of device requiring scales or other indicia.

What I claim and desire to secure by Letters Patent is:

1. A surveyor's level rod including, an elongated hollow body member having walls composed of laminations of fabric of synthetic resin-coated woven glass fibers, and graduations and markings of coloring material on an outer lamination and visible through the outermost lamination, the synthetic resin being fused by heat and pressure to secure the laminations together in an integral structure whereby the graduations and markings are protected from wear by the outermost lamination.

2. A surveyor's level rod including, an elongated hollow body member of substantially rectangular cross section and having walls composed of a plurality of wraps of fabric of synthetic resin-coated woven glass fibers, the outer wrap being substantially transparent, and a lamination next adjacent the outer wrap having graduations and markings of coloring material thereon visible through the outer wrap, the synthetic resin being fused by heat and pressure to secure the laminations together in an integral structure whereby the graduations and markings are protected from wear by the outer wrap.

3. The method of making a surveyor's level rod including, wrapping a plurality of layers of fabric of synthetic resin-coated woven glass fibers about a form to provide laminated wall sections, applying graduations and markings to the lamination of said fabric next adjacent the outer wrap visible through said outer wrap, applying heat and pressure to said wraps of fabric to fuse the synthetic resin to secure the wraps together in an integral structure, and removing the form from the wraps to provide a hollow structure.

AMBER N. BRUNSON.

REFERENCES CITED

The following references are of record in the file of this patent:

UNITED STATES PATENTS

| Number | Name | Date |
|---|---|---|
| 1,370,023 | Kempton | Mar. 1, 1921 |
| 1,710,595 | Taylor | Apr. 23, 1929 |
| 1,934,047 | Desnoyers et al. | Nov. 7, 1933 |
| 2,071,921 | Dickson | Feb. 23, 1937 |
| 2,084,081 | Faber | June 15, 1937 |
| 2,204,859 | Hyatt et al. | June 18, 1940 |
| 2,328,825 | McMahon | Sept. 7, 1943 |
| 2,410,361 | France | Oct. 29, 1946 |
| 2,414,125 | Rheinfrank, Jr. | Jan. 14, 1947 |
| 2,419,440 | Delmonte | Apr. 22, 1947 |

FOREIGN PATENTS

| Number | Country | Date |
|---|---|---|
| 246,886 | Great Britain | Feb. 9, 1926 |

OTHER REFERENCES

Rayon Textile Monthly, Nov. 1944, vol. 25, No. 11, page 81, "Dyeing and Printing Fiberglass Fabric," William H. Page.